(12) United States Patent
Trainin

(10) Patent No.: US 8,588,091 B2
(45) Date of Patent: Nov. 19, 2013

(54) DEVICE, SYSTEM AND METHOD OF WIRELESS COMMUNICATION OVER A COMBINED CHANNEL

(75) Inventor: Solomon Trainin, Haifa (IL)

(73) Assignee: Intel Corporation, Santa Clara, CA (US)

( * ) Notice: Subject to any disclaimer, the term of this patent is extended or adjusted under 35 U.S.C. 154(b) by 484 days.

(21) Appl. No.: 12/969,778

(22) Filed: Dec. 16, 2010

(65) Prior Publication Data

US 2012/0155295 A1 Jun. 21, 2012

(51) Int. Cl.
*H04L 12/28* (2006.01)
*H04J 1/16* (2006.01)

(52) U.S. Cl.
USPC ............................. 370/252; 370/338; 370/445

(58) Field of Classification Search
USPC .......................................... 370/252, 338, 445
See application file for complete search history.

(56) References Cited

U.S. PATENT DOCUMENTS

| 8,395,997 B2 * | 3/2013 | Banerjea et al. ............ 370/241 |
| 2009/0262688 A1 | 10/2009 | Tsai et al. |

OTHER PUBLICATIONS

IEEE Standard for Information technology—Telecommunications and information exchange between systems—Local and metropolitan area networks—Specific requirements Part 11: Wireless LAN Medium Access Control (MAC) and Physical Layer (PHY) Specifications; IEEE Std 802.11™-2007 (Revision of IEEE Std 802.11-1999 ).
Draft Standard for Information Technology—Telecommunications and information exchange between systems—Local and metropolitan area networks—Specific requirements-Part 11: Wireless LAN Medium Access Control (MAC) and Physical Layer (PHY) specifications:Amendment <number>: Enhancements for Higher Throughput; IEEE P802.11n/D2.00, Feb. 2007.
International Search Report and Written Opinion Received for PCT Patent Application No. PCT/US2011/062330, Mailed on Jul. 30, 2012, 9 pages.
Merlin et al., "CCA for RTS/CTS Operation in Wider Channels", IEEE 802.11-10/1280r2, Nov. 8, 2010, 8 pages.
Kneckt, et al., "Overlapping BSS Co-Existence", IEEE 802.11-10/1303r6, Nov. 11, 2010, 19 pages.
Gong, et al., "Medium Access for Wider Bandwidth", IEEE 802.11-10/1084rO, Sep. 12, 2010, 23 pages.
International Preliminary Report on Patentability Received for PCT Patent Application No. PCT/US2011/062330, mailed on Jun. 27, 2013, 7 pages.

* cited by examiner

*Primary Examiner* — John Pezzlo
(74) *Attorney, Agent, or Firm* — Shichrur & Co.

(57) ABSTRACT

Some demonstrative embodiments include devices, systems and/or methods of wireless communication over a combined channel. For example, a wireless communication unit may transmit a wireless communication transmission over a combined channel including a primary channel and at least one secondary channel, wherein the wireless communication unit is to begin the transmission over the combined channel if a detected state of use of the secondary channel is idle for at least a predefined silence period preceding an expiration of a back-off period corresponding to the primary channel, wherein the silence period is longer than a priority interframe space (PIFS) interval. Other embodiments are described and claimed.

28 Claims, 4 Drawing Sheets

DEVICE, SYSTEM AND METHOD OF WIRELESS COMMUNICATION OVER A COMBINED CHANNEL

BACKGROUND

An increased throughput, e.g., above 1 Gigabit-per-second (Gbps) per wireless communication client, may be required in order, for example, to satisfy a demand for transferring increased amounts of data within wireless communication networks, such as, for example, wireless local area networks (WLAN) and/or wireless personal area networks (WPAN). The increased throughput may be achieved, for example, by using a communication link having a wide bandwidth. For example, a bandwidth of more than 80 Mega-Hertz (MHz) may be required in order to provide a throughput greater than 1 Gbps, e.g., in a network operating over a frequency band of 5 Giga-Hertz (GHz) in accordance with the IEEE 802.11 standards. However, a likelihood of allocating a channel having a wide bandwidth may be relatively low due, for example, to interference, overlapping networks, regulatory limitations, and the like.

A plurality of wireless communication channels may be required in order to achieve the high bandwidth. For example, more than four 20 MHz channels may be required, e.g., according to the IEEE 802.11 standards, in order to achieve a bandwidth of more than 80 MHz In order to perform a transmission over a combined channel formed by a plurality of channels, a transmitter may be required not to interfere with potential overlapping communication networks, which may also be using one or more of the plurality of channels included in the combined channel. However, following the physical and virtual carrier sense rules in each of the channels of the combined channel may result in reduced transmission efficiency.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
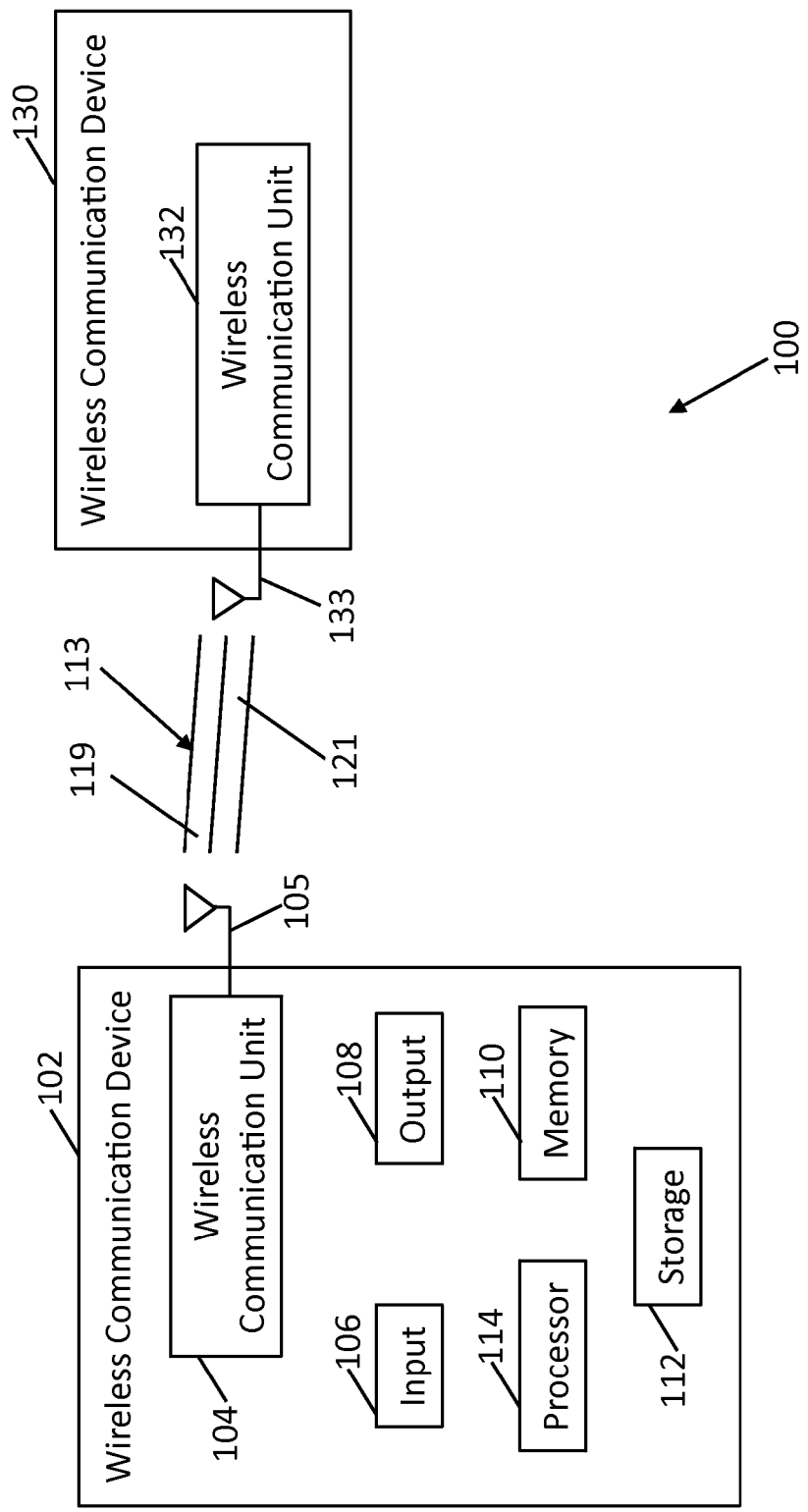
FIG. 1 is a schematic block diagram illustration of a system in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality" as used herein include, for example, "multiple" or "two or more". For example, "a plurality of items" includes two or more items.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a wired or wireless network, a wireless area network, a Wireless Video Area Network (WVAN), a Local Area Network (LAN), a Wireless LAN (WLAN), a Wireless Metropolitan Area Network (WMAN) communication system, a Personal Area Network (PAN), a Wireless PAN (WPAN), devices and/or networks operating in accordance with existing IEEE 802.11 standards ("the 802.11 standards"), e.g., including IEEE 802.11 (*IEEE 802.11—2007: Standard for Information technology—Telecommunications and information exchange between systems—Local and metropolitan area networks—Specific requirements, Part 11: Wireless LAN Medium Access Control (MAC) and Physical Layer (PHY) Specifications—June* 2007), 802.11n ("*IEEE 802.11n—2009—Amendment 5: Enhancements for Higher Throughput. IEEE-SA. 29 Oct.* 2009"), 802.11ac ("*Very High Throughput <6 Ghz*"), 802.11 task group ad (TGad) ("*Very High Throughput 60 GHz*"), and/or future versions and/or derivatives thereof, devices, and/or networks operating in accordance with IEEE 802.16 standards ("the 802.16 standards"), e.g., including 802.16 (*IEEE-Std 802.16, 2004 Edition, Air Interface for Fixed Broadband Wireless Access Systems*), 802.16d, 802.16e (*IEEE-Std 802.16e, 2005 Edition, Physical and Medium Access Control Layers for Combined Fixed and Mobile Operation in Licensed Bands*), 802.16f, 802.16m standards and/or future versions and/or derivatives thereof, devices, and/or networks operating in accordance with existing Wireless-Gigabit-Alliance (WGA) and/or WirelessHD™ specifications and/or future versions and/or derivatives thereof, devices and/or networks operating in accordance with existing cellular specifications and/or protocols, e.g., 3rd Generation Partnership Project (3GPP), 3GPP Long Term Evolution (LTE), and/or future versions and/or derivatives thereof, units and/or devices which are part of the above networks, one way and/or two-way radio communication systems, cellular radio-telephone communication systems, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a device having one or more internal antennas and/or external antennas, Digital Video Broadcast (DVB) devices or systems, multi-standard radio devices or systems, a wired or wireless handheld device (e.g., BlackBerry, Palm Treo), a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, Enhanced Data rates for GSM Evolution (EDGE), or the like. Other embodiments may be used in various other devices, systems and/or networks.

The term "wireless device" as used herein includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may be used to provide a wireless service.

Some demonstrative embodiments may be used in conjunction with a wireless communication network communicating over a frequency band of 60 GHz. However, other embodiments may be implemented utilizing any other suitable wireless communication frequency bands, for example, an Extremely High Frequency (EHF) band (the millimeter wave (mmwave) frequency band), e.g., a frequency band within the frequency band of between 30 Ghz and 300 GHZ, a WLAN frequency band, a WPAN frequency band, a frequency band according to the WGA specification, and the like.

Reference is now made to FIG. 1, which schematically illustrates a block diagram of a system 100 in accordance with some demonstrative embodiments.

As shown in FIG. 1, in some demonstrative embodiments, system 100 may include a wireless communication network including one or more wireless communication devices, e.g., wireless communication devices 102 and/or 130, capable of communicating content, data, information and/or signals via at lest one wireless communication link, for example, a radio channel, an IR channel, a RF channel, a Wireless Fidelity (WiFi) channel, and the like. One or more elements of system 100 may optionally be capable of communicating over any suitable wired communication links.

In some demonstrative embodiments, wireless communication devices 102 and/or 130 may include, or may be included as part of, for example, a PC, a desktop computer, a mobile computer, a laptop computer, a notebook computer, a tablet computer, a server computer, a handheld computer, a handheld device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a STB, a BD player, a BD recorder, a DVD player, a HD DVD player, a DVD recorder, a HD DVD recorder, a PVR, a broadcast HD receiver, a video source, an audio source, a video sink, an audio sink, a stereo tuner, a broadcast radio receiver, a flat panel display, a PMP, a DVC, a digital audio player, a speaker, an audio receiver, a gaming device, an audio amplifier, a data source, a data sink, a DSC, a media player, a Smartphone, a television, a music player, or the like.

In some demonstrative embodiments, wireless communication devices 102 and/or 130 may include wireless communication units 104 and/or 132, respectively, to perform wireless communication with wireless communication devices 102 and/or 130, respectively, and/or with one or more other wireless communication devices, e.g., as described below.

Wireless communication devices 102 and/or 130 may also include, for example, one or more of a processor 114, an input unit 106, an output unit 108, a memory unit 110, and a storage unit 112. Wireless communication devices 102 and/or 130 may optionally include other suitable hardware components and/or software components. In some demonstrative embodiments, some or all of the components of one or more of wireless communication devices 102 and/or 130 may be enclosed in a common housing or packaging, and may be interconnected or operably associated using one or more wired or wireless links. In other embodiments, components of one or more of wireless communication devices 102 and/or 130 may be distributed among multiple or separate devices.

Processor 114 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 114 executes instructions, for example, of an Operating System (OS) of wireless communication devices 102 and/or 130 and/or of one or more suitable applications.

Input unit 106 includes, for example, a keyboard, a keypad, a mouse, a touch-pad, a track-ball, a stylus, a microphone, or other suitable pointing device or input device. Output unit 108 includes, for example, a monitor, a screen, a flat panel display, a Cathode Ray Tube (CRT) display unit, a Liquid Crystal Display (LCD) display unit, a plasma display unit, one or more audio speakers or earphones, or other suitable output devices.

Memory unit 110 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 112 includes, for example, a hard disk drive, a floppy disk drive, a Compact Disk (CD) drive, a CD-ROM drive, a DVD drive, or other suitable removable or non-removable storage units. Memory unit 110 and/or storage unit 112, for example, may store data processed by wireless communication devices 102 and/or 130.

In some demonstrative embodiments, wireless communication units 104 and 132 may include, or may be associated with, one or more antennas 105 and 133, respectively. Antennas 105 and/or 133 may include any type of antennas suitable for transmitting and/or receiving wireless communication signals, blocks, frames, transmission streams, packets, messages and/or data. Types of antennae that may be used for antennas 105 and/or 133 may include but are not limited to internal antenna, dipole antenna, omni-directional antenna, a monopole antenna, an end fed antenna, a circularly polarized antenna, a micro-strip antenna, a diversity antenna, a phase array antenna and the like. In some embodiments, antennas 105 and/or 133 may implement transmit and receive functionalities using separate transmit and receive antenna elements. In some embodiments, antennas 105 and/or 133 may implement transmit and receive functionalities using common and/or integrated transmit/receive elements.

In some demonstrative embodiments, wireless communication units 104 and/or 132 include, for example, one or more wireless transmitters, receivers and/or transceivers able to send and/or receive wireless communication signals, RF signals, frames, blocks, transmission streams, packets, messages, data items, and/or data. For example, wireless communication units 104 and/or 132 may include or may be implemented as part of a wireless Network Interface Card (NIC), and the like.

In some demonstrative embodiments, wireless communication unit 104 may transmit a wireless communication transmission over a combined channel 113 including a primary channel 119 and at least one secondary channel 121.

In some demonstrative embodiments, combined channel 113 may have a bandwidth of at least 80 Mega-Hertz (MHz), e.g., at least 160 MHz. In other embodiments, combined channel 113 may have any other suitable bandwidth.

Some embodiments are described below with reference to communicating over a combined channel including a plurality of non-contiguous channels. However, other embodiments may be utilized for communicating over a combined channel including a combination of any other suitable plurality of wireless communication frequency channels.

In one example, an increased throughput, e.g., above 1 Gigabit-per-second (Gbps) per wireless communication client, may be required in order, for example, to satisfy a demand for transferring increased amounts of data within wireless communication networks, such as, for example, wireless local area networks (WLAN) and/or wireless personal area networks (WPAN). The increased throughput may be achieved, for example, by using a communication link having a wide bandwidth. For example, a bandwidth of more than 80 MHz may be required in order to provide a throughput greater than 1 Gbps, e.g., in a network operating over a frequency band of 5 Giga-Hertz (GHz) in accordance with the IEEE 802.11 standards. A plurality of wireless communication frequency channels may be required in order to achieve the high bandwidth. For example, more than four 20 MHz channels may be required, e.g., according to the IEEE 802.11 standards, in order to achieve a bandwidth of more than 80 MHz.

In one embodiment, combined channel 113 may include at least two channels, each having a bandwidth of at least 20 MHz, for example, at least 40 MHz, e.g., at least 80 MHz, or any other bandwidth. In other embodiments, combined channel 113 may include any other suitable number of wireless communication channels, which may have any other suitable bandwidth.

In some demonstrative embodiments, combined channel may be formed of at least two contiguous channels and/or at least two non-contiguous channels. The phrase "non-contiguous channels", as used herein, may refer to two or more wireless communication channels, which are not adjacent, neighboring, and/or bordering one another. In one example, first and second wireless communication channels may be non-contiguous if, for example, the first wireless communication channel is separated from the second wireless communication channel, e.g., by one or more other wireless communication channels, sub-channels, frequency bands, and the like.

Some demonstrative embodiments are described herein with reference to a combined channel, e.g., combined channel 113, including two wireless communication channels having equal bandwidth, e.g., two 80 MHz channels. However, in other embodiments, the combined channel may include two or more wireless communication channels of different bandwidths. In one example, the combined channel may include at least one channel having a bandwidth of 80 MHz and at least one channel having a bandwidth different from 80 MHz, e.g., 20 MHz, 40 MHz, 120 MHz, 160 MHz and the like. In other embodiments, the combined channel may include any other suitable combination of two or channels having any suitable bandwidth.

In some embodiments, combined channel 113 may include one or more additional channels, which may or may not be contiguous to one or more of the other channels of combined channel 113. For example, combined channel 113 may include first and second non-contiguous 80 MHz channels, and a third channel, e.g., an 80 MHz channel, which may be contiguous to one of the first and second channels.

In some demonstrative embodiments, at least one channel of the channels forming combined channel 113 may include two or more contiguous or non-contiguous channels or sub-channels. For example, combined channel 113 may be formed of at least one 80 Mhz cannel, which may include four 20 MHz channels, e.g., in accordance with the 802.11 standards and/or any other suitable standard and/or protocol.

In some demonstrative embodiments, wireless communication unit 104 may be required not to interfere with potential overlapping communication networks, which may also be using one or more of the plurality of channels included in combined channel 113. However, following the physical and virtual carrier sense rules in each of the channels of combined channel 113 may result in reduced transmission efficiency.

In some demonstrative embodiments, a channel of the plurality of channels forming combined channel 113 may be defined as a "primary channel" 119, while one or more other channels of the plurality of channels forming the combined channel may be defined as "secondary channels" 121.

In some demonstrative embodiments, wireless communication unit 104 may be configured to comply with the physical and virtual carrier sense rules for communicating over the primary channel. For example, wireless communication unit 104 may measure a back-off period according to a back-off mechanism for communication over the primary channel 119, e.g., in accordance with the 802.11 standards and/or any other suitable standard or protocol.

In some demonstrative embodiments, the back-off period may include a time period, which may be chosen by wireless communication unit 104, e.g., randomly. Wireless communication unit 104 may wait until the primary channel 119 has been idle for the back-off period before trying to transmit ("first transmission attempt") over primary channel 119. The back-off period may be defined, for example, using a Contention Window (CW), which may define a range of time periods, form which the back-off period is to be chosen. The CW period may be defined by a first value, denoted CWmin, which defines a minimum starting size of the CW, and a second value, denoted CWmax, which defines a maximal size of the CW. If the resulting first transmission attempt is unsuccessful, the length of the contention window can be repeatedly adjusted, for subsequent retries, up to the value CWmax, until a retry is successful, or until a maximal number of retransmissions are reached.

In some demonstrative embodiments, wireless communication unit 104 may be configured to observe a state of the secondary channel 121 and to perform a transmission over combined channel 113, for example, if the secondary channel 121 is observed to be idle for a silence period preceding an expiration of the back-off period. If combined channel 113 includes a plurality of secondary channels 121 the, in some embodiments, wireless communication unit 104 may be configured to perform a transmission over combined channel 113, for example, only if all of the secondary channels 121 are observed to be idle for the silence period.

In some demonstrative embodiments, wireless communication unit 104 may observe the state of use of the secondary channel 121 by observing a detected clear-channel-assessment (CCA) state of the secondary channel 121. For example, wireless communication unit 104 may utilize any suitable CCA mechanism for detecting the CCA of the secondary channel 121. The CCA mechanism may include, for example, a logical function, which may be implemented, for example, as part of a physical layer (PHY) of wireless communication unit 104, to determine the current state of use of primary channel 119. For example, the PHY of wireless communication unit 104 may provide a MAC of wireless communication unit 104 with a CCA state indication, which may have a first value ("BUSY") indicating that channel assessment by the PHY detects that secondary channel 121 is not available, or a second value ("IDLE") indicating that channel assessment by the PHY detects that secondary channel 121 is available.

In some demonstrative embodiments, wireless communication unit 104 may begin the transmission over combined channel 113 if a detected state of use, e.g., the detected CCA state, of the secondary channel 121 is idle for at least the silence period preceding the expiration of a back-off period corresponding to the primary channel 119, e.g., as described in detail below.

In some demonstrative embodiments, a timing of wireless communication unit 104 with respect to communications over the primary channel 119 may not be synchronized with a timing of wireless communication unit 104 with respect to communications over the secondary channel 121. For example, the timing of wireless communication unit 104 with respect to communications over the primary channel 119 may be shifted by up to a slot interval with respect to the timing of wireless communication unit 104 with respect to communications over the secondary channel 121, for example, due to activity of other wireless devices using the secondary channel 121 as a primary channel.

In some demonstrative embodiments, wireless communication unit 104 may be allowed to transmit the transmission over combined channel 113, for example, only if the secondary channel 121 is actually idle for a priority interframe space (PIFS) (also referred to as the "Point Coordination Function (PCF) interframe space") interval immediately preceding the expiration of the back-off period. The PIFS interval may be equal to the sum of a Short Interframe Space (SIFS) interval and a slot interval, e.g., as defined by the 802.11 standards. For example, the PIFS may be determined, e.g., as follows:

$$\text{PIFS} = a\text{SIFSTime} + a\text{SlotTime} \qquad (1)$$

wherein aSlotTime denotes a predefined slot time, e.g., in microseconds, which may be defined, for example, according to a communication protocol and/or standard implemented by wireless communication unit 104; and wherein aSIFSTime denotes a SIFS interval, which includes a nominal time period, e.g., in microseconds, required for wireless communication unit 104 to receive a last symbol of a frame at an air interface, process the frame, and respond with a first symbol on the air interface of an earliest possible response frame.

In one example, the PIFS may have a length of about 30 microseconds (µs), e.g., for a direct-sequence spread spectrum (DSSS) PHY, a length of about 25 µs, e.g., for an OFDM PHY, or any other suitable length.

In some demonstrative embodiments, one or more predefined detection periods may be required for wireless communication unit 104 to detect the state of use of the secondary channel 121. For example, a first predefined detection period ("idle detection period") may be required for wireless communication unit 104 to detect that the state of the secondary channel 121 is idle. The first detection period may include, for example, a time period between a time, at which the secondary channel 121 actually becomes idle and a time, at which wireless communication unit 104 detects that the state of the secondary channel 121 is idle. A second predefined detection period ("busy detection period") may be required for wireless communication unit 104 to detect that the state of the secondary channel 121 is busy. The second detection period may include, for example, a time period between a time, at which the secondary channel 121 actually becomes busy and a time, at which wireless communication unit 104 detects that the state of the secondary channel 121 is busy. In one example, a first predefined CCA detection period ("CCA idle detection period") may be required for wireless communication unit 104 to detect that the CCA of the secondary channel 121 is idle. The first CCA detection period may include, for example, a time period between a time, at which the secondary channel 121 actually becomes idle and a time, at which wireless communication unit 104 detects that the CCA of the secondary channel 121 is idle. A second predefined CCA detection period ("CCA busy detection period") may be required for wireless communication unit 104 to detect that the CCA of the secondary channel 121 is busy. The second CCA detection period may include, for example, a time period between a time, at which the secondary channel 121 actually becomes busy and a time, at which wireless communication unit 104 detects that the CCA of the secondary channel 121 is busy.

In some demonstrative embodiments, the idle detection period and the busy detection period may be different from one another. For example, the CCA busy detection period may be longer, e.g., about 16 µs longer, than the CCA idle detection period.

In some demonstrative embodiments, wireless communication unit 104 may reach an erroneous decision with respect to the state of the secondary channel 121, for example, if wireless communication unit 104 observes the CCA state of the secondary channel 121 only during the PIFS interval immediately preceding the expiration of the back-off period, e.g., as described below with reference to FIG. 2.

Figure 2:
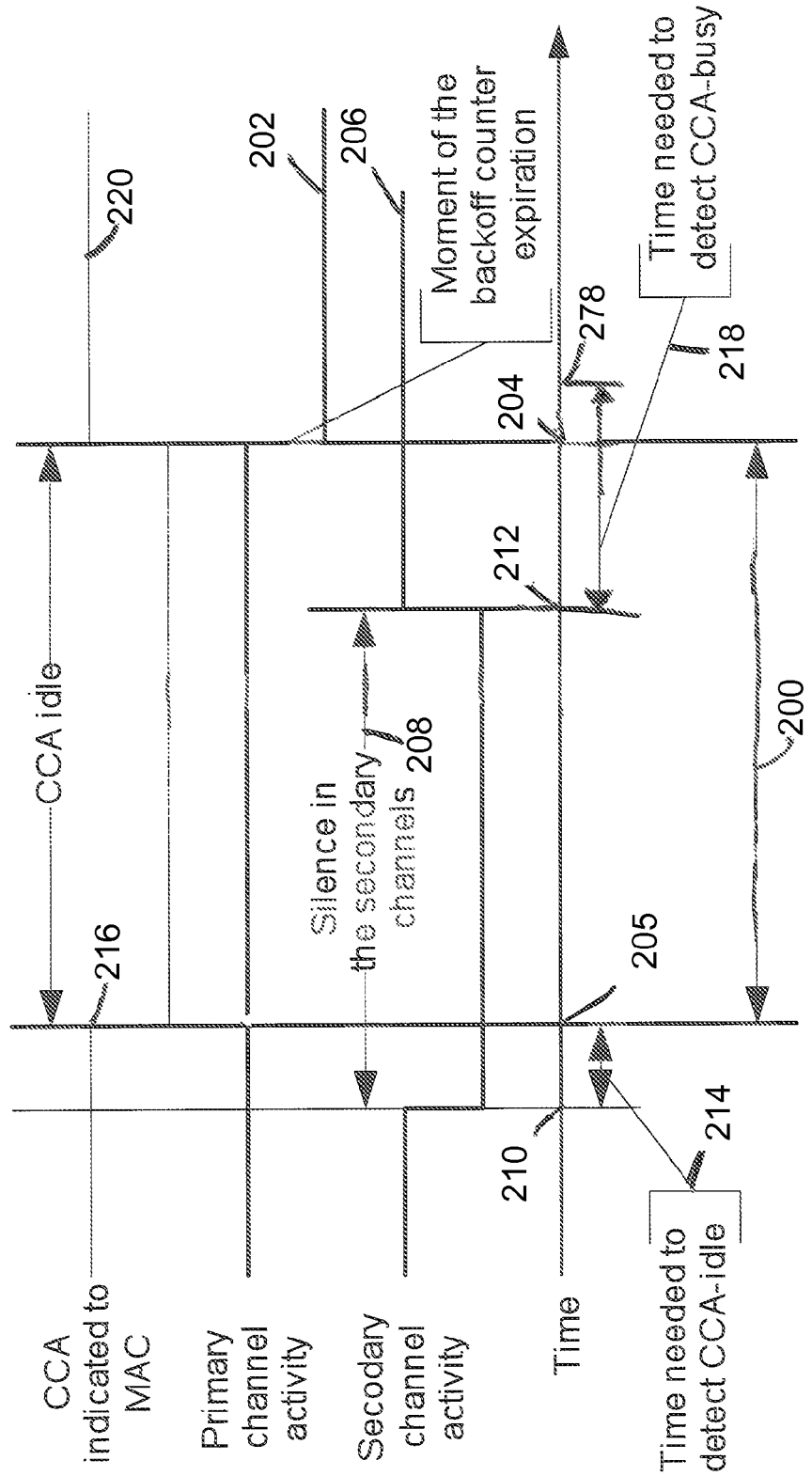
FIG. 2 is a schematic illustration of a detected state of a secondary channel according to a first silence period, in accordance with some demonstrative embodiments.

FIG. 2 is a schematic illustration of an observed CCA state 220 of a secondary channel, e.g., secondary channel 121 (FIG. 1), during a silence period 200 having a length equal to a PIFS interval, in accordance with some demonstrative embodiments.

As shown in FIG. 2, an activity pattern 202 over a primary channel, e.g., primary channel 119 (FIG. 1), may be idle at time 204 of an expiration of a back-off counter. The silence period 200 may be defined to begin at a time 205, which may be a PIFS interval preceding time 204.

As shown in FIG. 2, an actual activity pattern 206 over the secondary channel may include an actual idle period 208 beginning at a time 210 and ending at a time 212. The time 210 may be prior to time 205. The time 212 may be within silence period 200.

As shown in FIG. 2, a CCA idle detection interval 214 may be required for detecting the beginning of idle period 208. Accordingly, the beginning time of idle period 208 may be detected at a time 216. In one example, time 216 may occur at or before time 205.

As shown in FIG. 2, a CCA busy detection interval 218 may be required for detecting the end of idle period 208. Accordingly, the end time of idle period 208 may be detected at a time 278.

As shown in FIG. 2, observed CCA state 220 of the secondary channel, e.g., as observed by a wireless communication unit, may indicate that the secondary channel is idle during a period beginning at time 205, for example, if time 216 is at or before time 205, and ending at or after time 204, for example, if time 278 is at or after time 204. Accordingly, an observation of the state of the secondary channel during silence period 200 may be erroneous, for example, if time 212 is within period 200, while time 278 is at or after time 204. For example, based on observed CCA 220, a wireless communication unit may erroneously observe that the CCA of the secondary channel has been idle during the entirety of the PIFS interval prior to time 204, while the actual CCA of the secondary channel may have been busy during at least part of the PIFS interval, e.g., beginning at time 212.

In some demonstrative embodiments, the erroneous observation of the CCA state of the secondary channel may result from the CCA idle detection period, the CCA busy detection period and/or a relationship between the CCA idle detection period and the CCA busy detection period.

Referring back to FIG. 1, in some demonstrative embodiments, wireless communication unit 104 may utilize a silence period longer than the PIFS interval, and may begin the transmission over combined channel 113 if the detected state, e.g., the detected CCA state, of the secondary channel 121 is idle for at least the silence period preceding an expiration of a back-off period corresponding to the primary channel 119.

In some demonstrative embodiments, the silence period may be based on at least one predefined detection period required by wireless communication unit 104 to detect the state of use of secondary channel 121. For example, the silence period may be based on at least one predefined CCA detection period required by wireless communication unit 104 to detect the CCA state.

In some demonstrative embodiments, the silence period may be based on at least one of the idle detection period and the busy detection period. For example, the silence period may be based on at least one of the CCA idle detection period and the CCA busy detection period.

In some demonstrative embodiments, the silence period may be based on a relationship between the idle detection period and the busy detection period. For example, the silence period may be based on a relationship between the CCA idle detection period and the CCA busy detection period.

In some demonstrative embodiments, the silence period may be based on a difference between the idle detection period and the busy detection period. For example, the silence period may be based on a difference between the CCA idle detection period and the CCA busy detection period.

In some demonstrative embodiments, the silence period may have a length of at least the sum of the PIFS interval and a difference between the idle detection period and the busy detection period. For example, the silence period may have a length of at least the sum of the PIFS interval and a difference between the CCA idle detection period and the CCA busy detection period.

In some demonstrative embodiments, the silence period may be based on a predefined inaccuracy value relating to an inaccuracy of the PIFS interval. The inaccuracy value may include, for example, a value relating to a maximal inaccuracy of the PIFS interval in a sequence transmitted by an overlapping Basic Service Set (BSS) over the secondary channel 121, e.g., as defined by the 802.11 standards. In one example, the inaccuracy value may be about 1 μs.

In some demonstrative embodiments, the silence period may be defined as follows:

$$\text{Silence\_period} = \text{PIFS} + \Delta + \text{CCAdetectbusy} - \text{CCAdetect\_idle} \qquad (2)$$

wherein Silence_period denotes the silence period, Δ denotes the inaccuracy value, CCAdetectbusy denotes the CCA busy detection period, and CCAdetect_idle denotes the CCA idle detection period.

In other embodiments, the silence period may be defined based on any other suitable relationship and/or combination of one or more of the PIFS interval period, the CCA busy detection period, the CCA idle detection period and the inaccuracy value.

Figure 3:
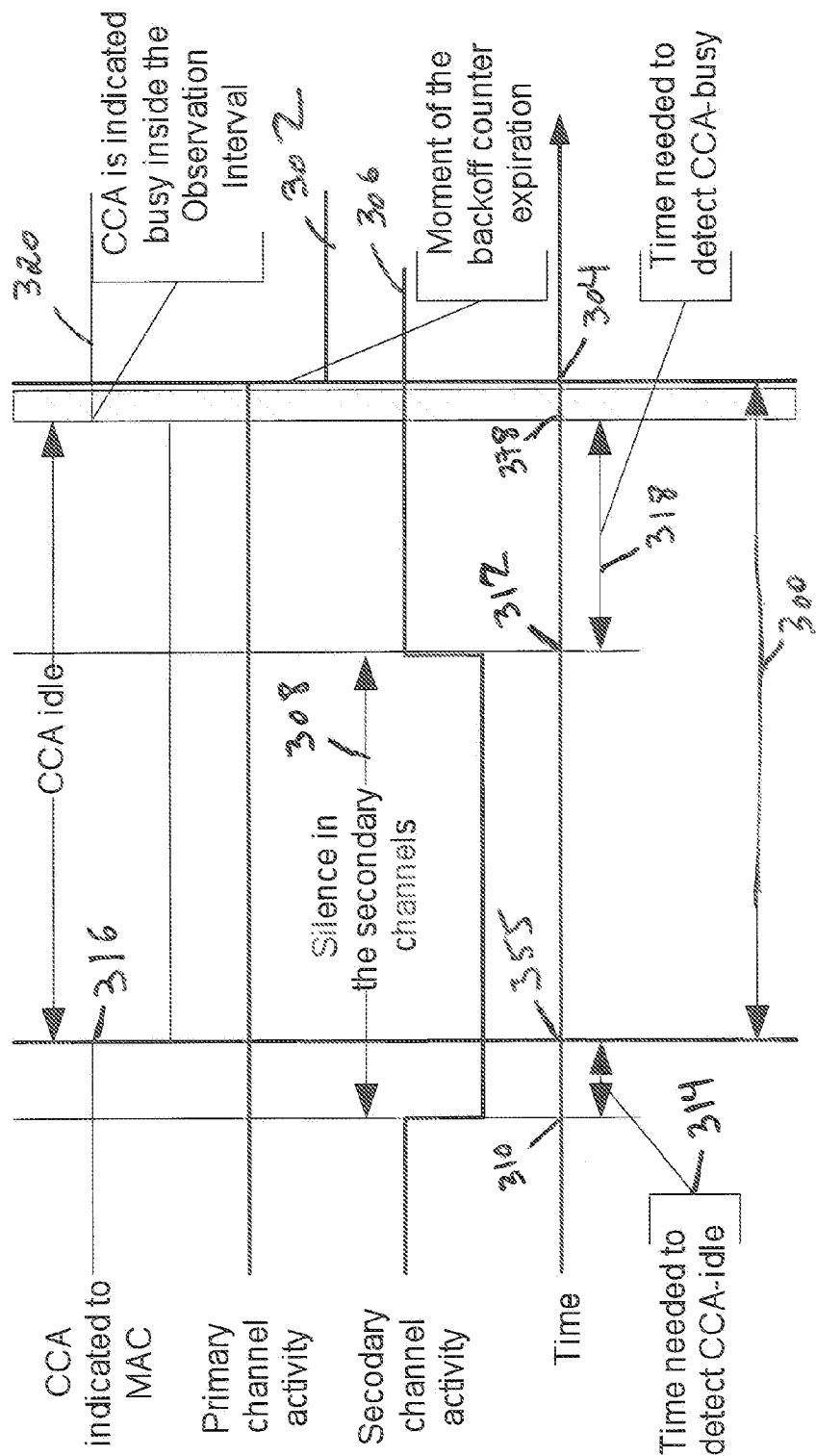
FIG. 3 is a schematic illustration of a detected state of a secondary channel according to a second silence period, in accordance with some demonstrative embodiments.

Reference is now made to FIG. 3, which schematically illustrates an observed CCA state 320 of a secondary channel, e.g., secondary channel 121 (FIG. 1), during a silence period 300 having a length greater than a PIFS interval, in accordance with some demonstrative embodiments. In some demonstrative embodiments, silence period 300 may be utilized by a wireless communication unit, e.g., wireless communication unit 104 (FIG. 1), for determining whether a secondary channel is idle, e.g., prior to transmitting over the combined channel.

As shown in FIG. 3, an activity pattern 302 over a primary channel, e.g., primary channel 119 (FIG. 1), may be idle at time 304 of an expiration of a back-off counter.

As shown in FIG. 3, an actual activity pattern 306 over a secondary channel may include an actual idle period 308 beginning at a time 310 and ending at a time 312.

As shown in FIG. 3, a CCA idle detection interval 314 may be required for detecting the beginning of idle period 308. Accordingly, the beginning time of idle period 308 may be detected at a time 316.

As shown in FIG. 3, a CCA busy detection interval 318 may be required for detecting the end of idle period 308. Accordingly, the end time of idle period 308 may be detected at a time 378.

As shown in FIG. 3, observed CCA state 320 of the secondary channel, e.g., as observed by wireless communication unit 104 (FIG. 1), may indicate that the secondary channel is idle during a period beginning at time 316 and ending at time 378.

In some demonstrative embodiments, silence period 300 may begin at a time 355 and end at time 304.

In some demonstrative embodiments, silence period 300 may have a length greater than the PIFS interval.

In some demonstrative embodiments, silence period 300 may be defined based on one or more CCA detection periods required for wireless communication unit 104 (FIG. 1) to detect the CCA state over the secondary channel.

In some demonstrative embodiments, silence period may be defined based on a difference between the CCA idle detection period and the CCA busy detection period. For example, silence period may be defined according to Equation 2.

As shown in FIG. 3, the length of silence period 300, which may be greater than the PIFS interval, may allow wireless communication unit 104 (FIG. 1) to observe the CCA busy state of the secondary channel 121 (FIG. 1), which actually occurs within a PIFS interval immediately preceding time 304, e.g., while taking into account the CCA busy detection interval 318. For example, silence period 300 may be long enough for wireless communication unit 104 (FIG. 1) to detect the busy state of the CCA of the secondary channel 121 (FIG. 1). Accordingly, silence period 300 may allow wireless communication unit 104 (FIG. 1) to ensure that the CCA state of the secondary channel 121 (FIG. 1) was actually idle during at least the PIFS interval immediately preceding back-off expiration time 304.

Figure 4:
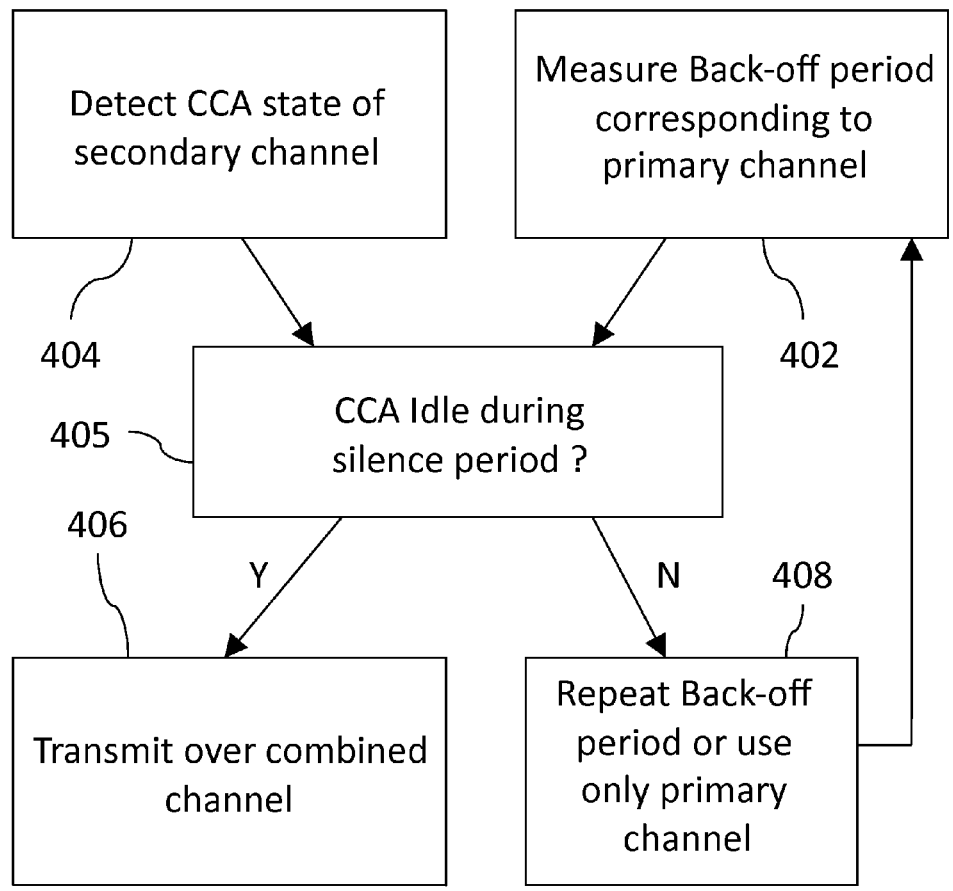
FIG. 4 is a schematic illustration of a method of wireless communication over a combined channel, in accordance with some demonstrative embodiments.

Reference is made to FIG. 4, which schematically illustrates a method of wireless communication over a combined channel, in accordance with some demonstrative embodiments. In some embodiments, one or more of the operations of the method of FIG. 4 may be performed by a system, e.g., system 100 (FIG. 1), a device, e.g., device 102 (FIG. 1) and/or a wireless communication unit, e.g., wireless communication unit 104 (FIG. 1).

As indicated at block 402, the method may include measuring a back-off period corresponding to a primary channel, e.g., primary channel 119 (FIG. 1), of a combined channel, e.g., combined channel 113 (FIG. 1), including the primary channel and at least one secondary channel, e.g., secondary channel 121 (FIG. 1). For example, wireless communication unit 104 (FIG. 1) may measure a back-off period corresponding to primary channel 119 (FIG. 1) of combined channel 113 (FIG. 1), e.g., as described above.

As indicated at block 404, the method may include detecting a state of use of the secondary channel. For example, wireless communication unit 104 (FIG. 1) may detect the CCA state of the at least one secondary channel 121 (FIG. 1) of combined channel 113 (FIG. 1), e.g., as described above.

As indicated at block 405, the method may include determining whether or not the detected state of use of the secondary channel is idle during a silence period preceding an expiration of the back-off period. The silence period may be based on at least one predefined CCA detection period required to detect the CCA state.

As indicated at block 406, the method may include transmitting a wireless communication transmission over the combined channel, for example, if the detected state of use of the secondary channel is idle for at least the predefined silence period. If the combined channel includes a plurality of secondary channels the, in some embodiments, the method may include transmitting the wireless communication transmission over the combined channel, for example, only if all of the secondary channels are observed to be idle for the silence period.

As indicated at block 408, the method may include repeating the measuring of the back-off period and/or transmitting a transmission only over the primary channel, e.g., while not transmitting over the secondary channel, for example, if the detected state of use of the secondary channel is busy during at least part of the silence period, e.g., if the detected CCA is not idle during the entirety of the silence period.

In some demonstrative embodiments, the silence period may be based on at least one of a first predefined detection period for detecting the state of the secondary channel is busy and a second predefined detection period for detecting the state of the secondary channel is idle, e.g., as described above.

In some demonstrative embodiments, the silence period may be longer than the PIFS interval, e.g., as described above.

Figure 5:
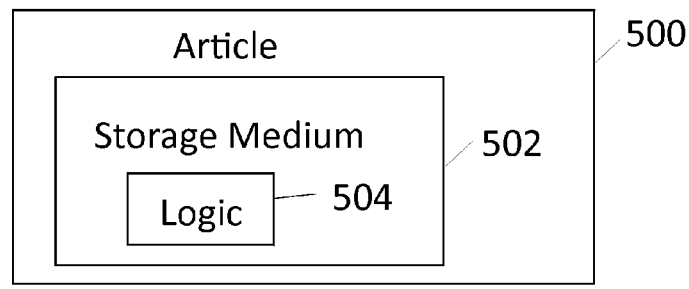
FIG. 5 is a schematic illustration of an article of manufacture, in accordance with some demonstrative embodiments.

Reference is made to FIG. 5, which schematically illustrates an article of manufacture 500, in accordance with some demonstrative embodiments. Article 500 may include a machine-readable storage medium 502 to store logic 504, which may be used, for example, to perform at least part of the functionality of wireless communication unit 104 (FIG. 1), wireless communication device 102 (FIG. 1), wireless communication unit 132 (FIG. 1), wireless communication device 130 (FIG. 1); and/or to perform one or more operations of the method of FIG. 4.

In some demonstrative embodiments, article 500 and/or machine-readable storage medium 502 may include one or more types of computer-readable storage media capable of storing data, including volatile memory, non-volatile memory, removable or non-removable memory, erasable or non-erasable memory, writeable or re-writeable memory, and the like. For example, machine-readable storage medium 502 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 504 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 504 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

Functions, operations, components and/or features described herein with reference to one or more embodiments, may be combined with, or may be utilized in combination with, one or more other functions, operations, components and/or features described herein with reference to one or more other embodiments, or vice versa.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A wireless communication device comprising:
a wireless communication unit to transmit a wireless communication transmission over a combined channel including a primary channel and at least one secondary channel,
wherein the wireless communication unit is to begin the transmission over the combined channel if a detected state of use of the secondary channel is idle for at least a predefined silence period preceding an expiration of a back-off period corresponding to the primary channel, wherein the silence period is longer than a priority interframe space (PIFS) interval.

2. The wireless communication device of claim 1, wherein the silence period is based on at least one predefined detection period required by the wireless communication unit to detect the state of use of the secondary channel.

3. The wireless communication device of claim 2, wherein the silence period is based on at least one of a first predefined detection period for detecting the secondary channel is busy and a second predefined detection period for detecting the secondary channel is idle.

4. The wireless communication device of claim 3, wherein the silence period is based on a relationship between the first and second detection periods.

5. The wireless communication device of claim 4, wherein the silence period is based on a difference between the first and second detection periods.

6. The wireless communication device of claim 5, wherein the silence period has a length of at least the sum of the PIFS interval and the difference between the first and second detection periods.

7. The wireless communication device of claim 6, wherein the silence period is defined as follows:

$$\text{Silence\_period} = \text{PIFS} + \Delta + \text{CCAdetectbusy} - \text{CCAdetect\_idle}$$

wherein Silence_period denotes the silence period, $\Delta$ denotes an inaccuracy value relating to an inaccuracy of the PIFS interval, CCAdetect_busy denotes a clear-channel-assessment (CCA) busy detection period, and CCAdetect_idle denotes a CCA idle detection period.

8. The wireless communication device of claim 1, wherein the detected state of use of the secondary channel includes a detected clear-channel-assessment (CCA) state of the secondary channel.

9. The wireless communication device of claim 1, wherein the silence period is based on a predefined inaccuracy value relating to an inaccuracy of the PIFS interval.

10. The wireless communication device of claim 1, wherein the combined channel has a bandwidth of at least 40 Mega Hertz (MHz), and wherein the primary and secondary channels have a bandwidth of at least 20 MHz.

11. A wireless communication system comprising:
a first wireless communication device comprising:
one or more antennas for communicating with a second wireless communication device over a combined channel including a primary channel and at least one secondary channel; and
a wireless communication unit to begin the transmission over the combined channel if a detected state of use of the secondary channel is idle for at least a predefined silence period preceding an expiration of a back-off period corresponding to the primary channel, wherein the silence period is based on at least one predefined detection period required by the wireless communication unit to detect the state of use of the secondary channel.

12. The wireless communication system of claim 11, wherein the at least one predefined detection period includes at least one of a first predefined detection period for detecting the secondary channel is busy and the other state of a second predefined detection period for detecting the secondary channel is idle.

13. The wireless communication system of claim 12, wherein the silence period is based on a relationship between the first and second detection periods.

14. The wireless communication system of claim 13, wherein the silence period is based on a difference between the first and second detection periods.

15. The wireless communication system of claim 14, wherein the silence period has a length of at least the sum of a priority interframe space (PIFS) interval and the difference between the first and second detection periods.

16. The wireless communication system of claim 15, wherein the silence period is defined as follows:

$$\text{Silence\_period} = \text{PIFS} + \Delta + \text{CCAdetectbusy} - \text{CCAdetect\_idle}$$

wherein Silence_period denotes the silence period, $\Delta$ denotes an inaccuracy value relating to an inaccuracy of the PIFS interval, CCAdetectbusy denotes a clear-channel-assessment (CCA) busy detection period, and CCAdetect_idle denotes a CCA idle detection period.

17. The wireless communication system of claim 11, wherein the detected state of use of the secondary channel includes a detected clear-channel-assessment (CCA) state of the secondary channel.

18. The wireless communication system of claim 11, wherein the silence period is longer than a priority interframe space (PIFS) interval.

19. The wireless communication system of claim 11, wherein the combined channel has a bandwidth of at least 40 Mega Hertz (MHz), and wherein the primary and secondary channels have a bandwidth of at least 20 MHz.

20. A method comprising:
measuring a back-off period corresponding to a primary channel of a combined channel including the primary channel and at least one secondary channel;
detecting a state of use of the secondary channel; and
if the detected state of use of the secondary channel is idle for at least a predefined silence period preceding an expiration of the back-off period, transmitting a wireless communication transmission over the combined channel, wherein the silence period is based on at least one predefined detection period required to detect the state of use of the secondary channel.

21. The method of claim 20, wherein the at least one predefined detection period includes at least one of a first predefined detection period for detecting the secondary channel is busy and a second predefined detection period for detecting the secondary channel is idle.

22. The method of claim 21, wherein the silence period is based on a relationship between the first and second detection periods.

23. The method of claim 22, wherein the silence period is based on a difference between the first and second detection periods.

24. The method of claim 23, wherein the silence period has a length of at least the sum of a priority interframe space (PIFS) interval and the difference between the first and second detection periods.

25. The method of claim 24, wherein the silence period is defined as follows:

$$\text{Silence\_period} = \text{PIFS} + \Delta + \text{CCAdetectbusy} - \text{CCAdetect\_idle}$$

wherein Silence_period denotes the silence period, $\Delta$ denotes an inaccuracy value relating to an inaccuracy of the PIFS interval, CCAdetectbusy denotes a clear-channel-assessment (CCA) busy detection period, and CCAdetect_idle denotes a CCA idle detection period.

26. The method of claim 20, wherein the silence period is longer than a priority interframe space (PIFS) interval.

27. The method of claim 20, wherein the detected state of use of the secondary channel includes a detected clear-channel-assessment (CCA) state of the secondary channel.

28. The method of claim 20, wherein the combined channel has a bandwidth of at least 40 Mega Hertz (MHz), and wherein the primary and secondary channels have a bandwidth of at least 20 MHz.

* * * * *

UNITED STATES PATENT AND TRADEMARK OFFICE
CERTIFICATE OF CORRECTION

PATENT NO.       : 8,588,091 B2                                          Page 1 of 1
APPLICATION NO.  : 12/969778
DATED            : November 19, 2013
INVENTOR(S)      : Solomon Trainin It is certified that error appears in the above-identified patent and that said Letters Patent is hereby corrected as shown below:

In the Drawings:

On sheet 2 of 4, in Figure 2, line 7, delete "Secodary" and insert -- Secondary --, therefor.

On sheet 3 of 4, in Figure 3, line 7, delete "Secodary" and insert -- Secondary --, therefor.

In the Claims:

In column 13, line 61, In Claim 7, delete "CCAdetect_busy" and insert -- CCAdetectbusy --, therefor.

Signed and Sealed this
Twenty-fifth Day of February, 2014

Michelle K. Lee
*Deputy Director of the United States Patent and Trademark Office*